W. A. BERNARD.
HAND TOOL.
APPLICATION FILED OCT. 29, 1915.
1,168,051.
Patented Jan. 11, 1916.
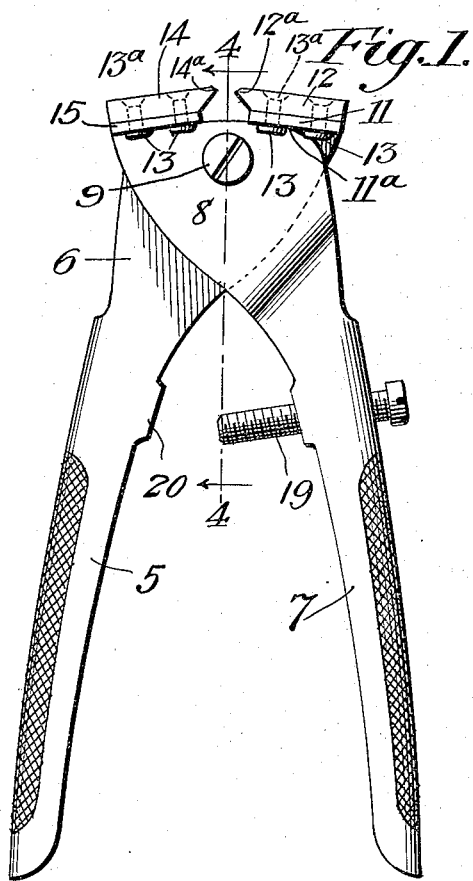
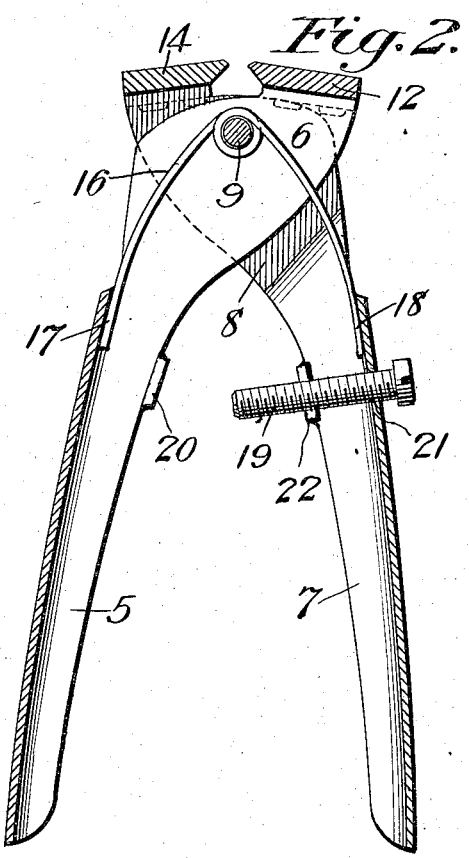
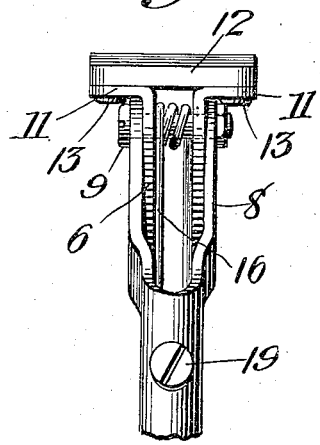
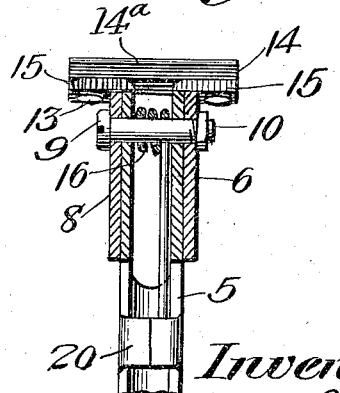
Inventor:
W. A. Bernard
by Mary J. Palmer
his attorney.
COLUMBIA PLANOGRAPH CO., WASHINGTON, D. C.

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT, A CORPORATION OF CONNECTICUT.

HAND-TOOL.

1,168,051.  Specification of Letters Patent.  Patented Jan. 11, 1916.

Application filed October 29, 1915. Serial No. 58,717.

*To all whom it may concern:*

Be it known that I, WILLIAM A. BERNARD, of the city and county of New Haven, State of Connecticut, have invented certain new and useful Improvements in Hand-Tools, of which the following is a full, clear, and exact description.

This invention relates to hand tools, and more particularly to so-called end nippers.

The primary object of the invention is to provide an end nipper of very strong and durable construction, in which the cutting edges may be made of the very best grade of tool steel, although the cost of the implement is quite low.

To this and other ends, the invention consists in the novel features and combinations of parts to be hereinafter described and claimed.

In the accompanying drawing, Figure 1 is a side elevation of a tool embodying the invention; Fig. 2 is a longitudinal section of the tool; Fig. 3 is a fragmentary edge view, looking from the right of Fig. 1; and Fig. 4 is a fragmentary section on line 4—4 of Fig. 1.

The tool comprises two lever members crossed and pivoted between their ends, said lever members being constructed preferably of sheet metal. In front of the pivot, each lever member carries a cutting jaw of tool steel, and at the rear of the pivot levers are bent up into U-shaped cross-section so as to form a convenient grip for the workman.

In the drawing, the lever 5 of U-shaped cross-section is provided with a widened forked forward end portion 6, the side portions or plate of the fork being located in the same plane as the respective side members of the handle proper. The lever 7 has a forked forward portion 8 substantially similar to the portion 6, but the side portions of the fork 8 are offset, so as to extend around the fork 6 on opposite sides, as shown. A pivot member, such as a bolt 9, passes through the crossed forks of the two lever members and pivots them together at a point closely adjacent to the forward extremities of said members, said pivot bolt having a detachable nut 10. As shown particularly in Figs. 1 and 3, a portion of the forward extremity of the fork 6 which is disposed at one side of the median line of the tool, is provided with outwardly bent flanges 11 to which is secured a cutting blade 12. This cutting blade 12 bridges the fork 6, and is supported on both flanges or lugs 11. Preferably, the cutting blade 12 is secured to the lugs 11 by means of rivets 13, and in the form shown, there are two rivets passing through each flange 11, said rivets having heads abutting the flanges 11 outside of but closely adjacent to the main part of the fork 6. At their opposite ends, the rivets are provided with heads 13$^a$ counter-sunk in the blade 12, so as to be flush with the outer surface of said blade at the head of the tool. The fork 8 of the member 7 carries a cutting blade 14 in substantially the same manner previously described, except that the flanges 15 bent outwardly or laterally from the sides of the fork 8, and located on the opposite side of the tool with reference to the flanges 11, are somewhat shorter than the flanges 11, so that the cutting blade 14 which is likewise secured on the flanges by means of rivets 13 may be symmetrically formed and located with respect to its coöperating blade 12. At their adjacent edges, these cutting blades 12, 14 are provided with beveled coöperating cutting edges 12$^a$, 14$^a$, which are brought together by a closing movement of the tool handles, so as to cut off the wire or other material in an obvious manner. Inasmuch as the cutting blades extend laterally from the head of the tool on opposite sides, an end cutter having a cutting edge of considerable length is provided, and it is possible to utilize the overhanging extremities of the cutting blades for cutting off a wire passing lengthwise between the jaws at either side of the tool, as well as a wire or similar article which is inserted between the middle portions of the jaws.

Each of the outwardly bent flanges 11, 15 is of the same thickness as the side wall of the lever member on which it is formed and the cutters are of substantially the same width as the flanges.

A wire spring 16 coiled about the pivot pin or bolt 9 within the fork 6 of lever 5 has one end reacting against the lever 5 at 17, as shown in Fig. 2, while the opposite end reacts against the lever 7 at 18. This spring, therefore, tends to separate the jaws of the tool, as shown in Figs. 1 and 2. The opening movement of the jaws relatively to each other is limited by the abutment of the flanges 11 against the opposing edges of the fork 8 at the point 11ª, as shown in Fig. 1. This prevents the jaws from being separated to an undue extent under the influence of the spring. The edge portion of the enlarged part 8 of lever 7 which is located in front of the pivot is carried from the flange 15 across to the other flange 11, and is adapted to engage the last-named flange at about the point 11ª which is located between the rivet heads 13 beneath the flange 11 and the side wall of the forked portion 6. The closing movement of the jaws is also preferably limited by suitable means, and in the form shown, this consists of an adjustable stop screw 19 on one handle (as 7) adapted to coöperate with an abutment 20 on the other handle (as 5). It has been previously stated that the handles 5, 7 are bent into U-shape cross-section from sheet metal, and in order to provide the abutment 20, small lugs or extensions formed integral with the handle blank are bent inward into contact with each other at the inner part of the handle, as shown at Fig. 4. This provides a stop extending from one edge of the U-shaped handle to the other edge. The stop screw 19 passes inwardly through the handle 7, and has a threaded bearing 21 in the outer portion of the handle, and a second threaded bearing in a bridge piece 22 at the inner part of the handle 7. This bridge piece 22 is constructed in substantially the same manner as the abutment 20, but after the meeting lugs are brought together, as shown in Fig. 4, the bridge piece is drilled and tapped to provide a screw socket for the stop screw. The stop screw should be so adjusted that its inner extremity contacts with the abutment 20 before the cutting edges 12ª, 14ª come into full contact with each other so as to prevent said cutting edges from becoming dulled.

The rivets 13 are so located that their lower or rearwardly disposed heads may project from the under surfaces of the flanges 11, 15, while the heads 13ª of said rivets which are countersunk in the corresponding blades may be polished off flush with the blade surfaces at the end of the tool.
All of the rivets at one side of the tool are preferably located in a plane outside of the plane of the corresponding side wall of the forked portion 8. The perforations in the cutter blades for the rivets may thus be similarly located in each cutter blade so that any given blade may be applied either to the inner or outer lever member.

By constructing the operating handles of sheet metal and mounting the blades on the flanges in the manner described, the weight and cost of the tool are materially lessened without decreasing its strength, and this also applies to the particular stop mechanism described for limiting the approaching movement of the U-shaped handles.

Without limiting myself to the precise construction shown, I claim:

1. In a hand tool, the combination of sheet metal lever handles of U-shaped cross-section having widened forked forward end portions pivoted together, one of said portions being offset so as to straddle the other, each of said forked portions having lateral and outwardly bent flanges of the same thickness as the side walls of said forked portions, the flanges of each fork projecting laterally from the tool on opposite sides, cutting blades bridging the respective forked portions and each resting on the outturned flanges of the corresponding forked portion, and rivets for securing said cutting blades to said sheet metal flanges, said rivets having heads located at the rear or under surfaces of said flanges, and the cutting blades being of substantially the same width as the respective supporting flanges; substantially as described.

2. In a hand tool, the combination of a lever member constructed of sheet metal and having a forked forward portion, outturned flanges on the extremity of said forward portion formed of sheet metal integrally with said lever member, a second lever member having a forked forward portion straddling and pivoted to the first forked portion, coöperating cutting blades carried respectively by the second lever member and by the outturned flanges on the first lever member, rivets passing through said outturned flanges and the corresponding cutting blade for securing the latter to said flanges, said rivets having heads at the lower or under surface of said flanges, and the forked portion of said second lever member being extended behind at least one of said flanges in close proximity thereto at a point between one of said rivet heads and the adjacent side wall of the forked forward portion of the first lever so that said edge will abut said flange and thereby limit the separation of the cutting blades; substantially as described.

3. In a hand tool, the combination of a lever member constructed of sheet metal and having a widened forked forward portion, outturned flanges integral with the edges of the fork at the forward extremity thereof, a second lever member of sheet metal having a forked forward portion which is offset so as to straddle said first forked portion, means for pivoting said forked portions together, outturned flanges integral with the edges of the second forked portion, all of said flanges being of the same thickness as the side walls of the respective forked portions, a cutting blade of substantially the same width as the flanges of the first lever member bridging the forked portion of said lever member and seated on said flanges, a similar cutting blade bridging the forked portion of said lever member and seated on the flanges thereof, and a plurality of rivets extending through the outer portion of each flange into the corresponding cutting blade, all of the rivets at one face of the tool being located in the same plane, and the forked portion of the second lever member being extended back of one of the flanges on the first lever member between the forked portion of the first lever member and one of said rivets so as to act as a stop for limiting the separation of the cutting blades; substantially as described.

4. In a hand tool, the combination of pivoted lever members, one of said members being constructed of sheet metal bent up into U-shaped cross-section, lugs formed integral with the inner edges of said last-named member and substantially meeting each other to present a stop surface at the inner part of the U-shaped member, and a stop device mounted on the other lever member, adapted to engage said stop surface; substantially as described.

5. In a hand tool, the combination of pivoted lever members, one of said members being constructed of sheet metal bent up into U-shaped cross-section, lugs formed integral with the inner edges of said last-named member and substantially meeting each other, there being a screw socket at the adjacent edges of said lugs, a stop screw engaging said socket and adjustable therein, and a stop surface on the other lever member to coöperate with said screw; substantially as described.

In witness whereof, I have hereunto set my hand on the 28th day of October, 1915.

WILLIAM A. BERNARD.

Copies of this patent may be obtained for five cents each, by addressing the "Commissioner of Patents, Washington, D. C."